(12) United States Patent
Lidström

(10) Patent No.: US 9,831,791 B2
(45) Date of Patent: Nov. 28, 2017

(54) QUASI-RESONANT MAGNETRON POWER SUPPLY

(71) Applicant: B/E AEROSPACE, INC., Wellington, FL (US)

(72) Inventor: Kjell Lidström, Burea (SE)

(73) Assignee: B/E Aerospace, Inc., Wellington, FL (US)

(*) Notice: Subject to any disclaimer, the term of this patent is extended or adjusted under 35 U.S.C. 154(b) by 6 days.

(21) Appl. No.: 14/962,366

(22) Filed: Dec. 8, 2015

(65) Prior Publication Data

US 2016/0164423 A1 Jun. 9, 2016

Related U.S. Application Data

(60) Provisional application No. 62/089,111, filed on Dec. 8, 2014.

(51) Int. Cl.
*H02M 3/335* (2006.01)
*H02M 3/337* (2006.01)
*H02M 1/42* (2007.01)
H02M 1/15 (2006.01)
H02M 3/28 (2006.01)
H02M 1/00 (2006.01)

(52) U.S. Cl.
CPC ....... *H02M 3/3376* (2013.01); *H02M 1/4258* (2013.01); *H02M 1/15* (2013.01); *H02M 3/285* (2013.01); *H02M 2001/0058* (2013.01); *H02M 2001/0077* (2013.01); *Y02B 70/126* (2013.01); *Y02B 70/1433* (2013.01); *Y02B 70/1491* (2013.01)

(58) Field of Classification Search
CPC ..... H02M 3/33553; H02M 2001/0058; H02M 1/32; Y02B 40/143; H05B 6/66

USPC .......... 363/16, 17, 21.04, 21.02, 49, 74, 98; 315/224, 276, 307; 323/222, 225, 323/282–290
See application file for complete search history.

(56) References Cited

U.S. PATENT DOCUMENTS 3,663,828 A    5/1972  Low et al.
5,001,318 A  * 3/1991  Noda ................. H01J 25/587
                                                     219/716

(Continued)

FOREIGN PATENT DOCUMENTS

GB        2365229 B    5/2003

OTHER PUBLICATIONS

International Search Report and Written Opinion issued in corresponding application PCT/US2015/064466, dated Mar. 4, 2016, 12 pages.

*Primary Examiner* — Rajnikant Patel
(74) *Attorney, Agent, or Firm* — Drinker Biddle & Reath LLP

(57) ABSTRACT

A power supply comprises at least one input to couple the power supply to a power source. The power supply also comprises at least one switched-mode power circuit configured to extract electrical energy from the power source, the electrical energy to be transferred to a load. The power supply additionally comprises at least one control module coupled between the at least one input and the at least one switched-mode power circuit. The control module is configured to control operation of the switched-mode power circuit to regulate a voltage-to-current ratio at the at least one input of the power supply.

20 Claims, 7 Drawing Sheets

(56) References Cited

U.S. PATENT DOCUMENTS

| | | | | |
|---|---|---|---|---|
| 5,245,520 A * | 9/1993 | Imbertson | ............ | H02M 3/337 363/132 |
| 5,250,774 A * | 10/1993 | Lee | ........................ | H01J 23/34 219/746 |
| 7,885,085 B2 * | 2/2011 | Orr | ..................... | H02M 1/4225 363/21.02 |
| 8,492,687 B2 * | 7/2013 | Suenaga | ................ | H05B 6/685 219/702 |
| 8,976,542 B2 * | 3/2015 | Richardson | ............. | H01J 1/135 219/715 |
| 9,537,403 B2 * | 1/2017 | Zhang | ............... | H02M 3/33523 |
| 2006/0002155 A1 * | 1/2006 | Shteynberg | ......... | H02M 1/4258 363/21.12 |
| 2012/0120697 A1 | 5/2012 | Cuk | | |
| 2012/0139519 A1 | 6/2012 | Dearborn | | |
| 2013/0100709 A1 | 4/2013 | Lidstrom | | |
| 2014/0268909 A1 * | 9/2014 | Digiacomo | ....... | H02M 3/33553 363/21.04 |

* cited by examiner

QUASI-RESONANT MAGNETRON POWER SUPPLY

CROSS-REFERENCE TO RELATED PATENT APPLICATIONS

The present application claims the benefit of U.S. Provisional Application No. 62/089,111, filed Dec. 8, 2014, herein incorporated by reference.

FIELD

Disclosed herein is a power supply system, more particularly, a quasi-resonant three-phase magnetron power supply.

BACKGROUND

In a typical magnetron application, such as a microwave heating application or a plasma light source application, a power supply may be used to convert power provided by a multi-phase power source, such as a three-phase power mains grid power source, to a power suitable for use by the magnetron, and to supply the power to the magnetron. Conventional multi-phase power supplies, however, typically produce a large degree of ripple at the output of the power supply, which may result in a large degree of radio frequency (RF) emissions produced by the magnetron. Further, conventional multi-phase power supplies typically include power factor correction circuits, and accompanying power factor correction electrolytic components, that make the conventional multi-phase power supplies expensive, in both size and cost, and render the conventional power supplies insufficiently reliable for use in some magnetron applications, such as in airborne microwave heating applications.

SUMMARY

A power supply suitable for providing power to a magnetron, such as a magnetron used on a microwave oven, is described. The power supply is suitable for use in applications in which robustness and high reliability is generally needed or desired, such as in microwave ovens used on aircrafts. The power supply is suitable for use in other applications as well.

In an example embodiment, the power supply includes a switched-mode power circuit and a control module that controls operation of the switched-mode power circuit so as to make the power supply appear as a linear resistive load with respect to a power source. The control module may comprise an analog feedback loop circuit or a digital processor, configured to control operation of the switched-mode power circuit. Ensuring that the power supply appears as a linear resistive load with respect to the power source ensures that output of the power supply is at least substantially ripple free and that the power supply achieves a power factor of 1 or close to 1.

According to an embodiment, a power supply comprises at least one input to couple the power supply to a power source. The power supply also comprises at least one switched-mode power circuit configured to extract electrical energy from the power source, wherein the electrical energy is to be transferred to a load. The power supply additionally comprises at least one control module coupled between the input and the switched-mode power circuit, wherein the control module is configured to control operation of the switched-mode power circuit to regulate a voltage-to-current ratio at the input of the power supply.

In other embodiments, the power supply comprises any suitable combination of one or more of the following features.

The power source is a three-phase mains power source.

The input comprises respective inputs to couple the power supply to respective phases of the three-phase mains power source.

The switched-mode power circuit comprises respective switched-mode power circuits to extract electrical energy from the respective phases of the three-phase mains power source.

The control module comprises respective control modules configured to control operation of the respective switched-mode power circuits, wherein each of the respective control modules is configured to regulate a voltage-to-current ratio at the corresponding input of the power supply.

The power supply further comprises respective power transformers coupled to outputs of the respective switched-mode power circuits and respective rectifier circuits coupled to outputs of the respective power transformers.

Outputs of the respective rectifier circuits are connected in series to produce a single power supply output to couple the power supply to the load.

The control module is configured to regulate the voltage-to-current ratio at the input of the power supply to make the power supply appear as a linear resistive load to the power source.

The control module includes an error amplifier and a control unit.

The control unit is coupled to the switched-mode power circuit and configured to control operation of the switched-mode power circuit in accordance with a control signal.

The error amplifier is configured to detect a difference between a voltage wave shape and a current wave shape at the input of the power supply, and adjust a level of the control signal in accordance with the detected difference between the voltage wave shape and the current wave shape.

The control unit comprises a voltage controlled oscillator coupled to a field effect transistor driver circuit, wherein a frequency of the voltage controlled oscillator is controlled by the control signal.

The control module includes a digital signal processor configured to generate a control signal to control operation of the switched-mode power circuit based on a sampled voltage wave at the input of the power supply.

The control module is isolated from the switched-mode power circuit and the power supply further comprises an optocoupler to transfer the control signal from the control module to the switched-mode power circuit.

The load is a magnetron.

According to another embodiment, a power supply comprises a respective input to couple the power supply to each of three phase outputs of a three-phase power source. The power supply further comprises a respective switched-mode power circuit configured to extract electrical energy from a corresponding phase of the power source. The power supply additionally comprises one or more control modules coupled between the respective power source inputs and the respective switched-mode power circuits. The one or more control modules are configured to control operation of the respective switched-mode power circuits to regulate a voltage-to-current ratio at each of the respective inputs of the power supply.

In other embodiments, the power supply comprises any suitable combination of one or more of the following features.

The one or more control modules comprise a respective error amplifier and a respective control unit for each of the three phases.

Each respective control unit is configured to control operation of the corresponding switched-mode power circuit in accordance with a control signal.

Each respective error amplifier is configured to detect a difference between a voltage wave shape and a current wave shape at the corresponding input of the power supply, and adjust a level of the control signal in accordance with the detected difference between the voltage wave shape and the current wave shape.

Each control unit comprises a voltage controlled oscillator coupled to a field effect transistor driver circuit, wherein the voltage controlled oscillator is configured to control operation of the field effect resistor, wherein a frequency of the voltage controlled oscillator is controlled by the control signal.

The one or more control modules comprise one or more digital signal processors configured to generate control signals to control operation of the respective switched-mode power circuits based on based on respective sampled voltage waves at the respective inputs of the power supply.

The one or more control modules are isolated from the respective switched-mode power circuits.

The power supply further comprises respective optocouplers to transfer control signals from the one or more control modules to the respective switched-mode power circuits.

According to yet another embodiment, a method of regulating a power supply having an input to couple the power supply to a power source and a switched-mode power circuit to extract electrical energy from the power source, wherein the electrical energy is to be provided to a load, comprises obtaining a first signal indicative of a voltage wave shape at the input of the power supply. The method further comprises obtaining a second signal indicative of a current wave shape at the input of the power supply. The method additionally comprises comparing the first signal and the second signal to detect a difference between the first signal and the second signal. The method also comprises controlling, based on the detected difference between the first signal and the second signal, operation of the switched-mode power circuit to regulate a voltage-to-current ratio at the input of the power supply.

In other embodiments, the method further comprises any suitable combination of one or more of the following features.

Obtaining the first signal comprises obtaining the first single from a rectified voltage signal at the input of the power supply.

Obtaining the second signal comprises sensing a current signal at the input of the power supply using a current sense resistor.

Obtaining the second signal comprises obtaining the second signal via an adjustable resistor.

The method further comprises modulating a resistance of the adjustable resistor to adjust amount of energy extracted by the switched-mode power circuit from the power source.

Obtaining the first signal comprises obtaining the first signal via an adjustable resistor.

The method further comprises modulating a resistance of the adjustable resistor to adjust amount of energy extracted by the switched-mode power circuit from the power source.

The load is a magnetron.

DETAILED DESCRIPTION

Figure 1A:
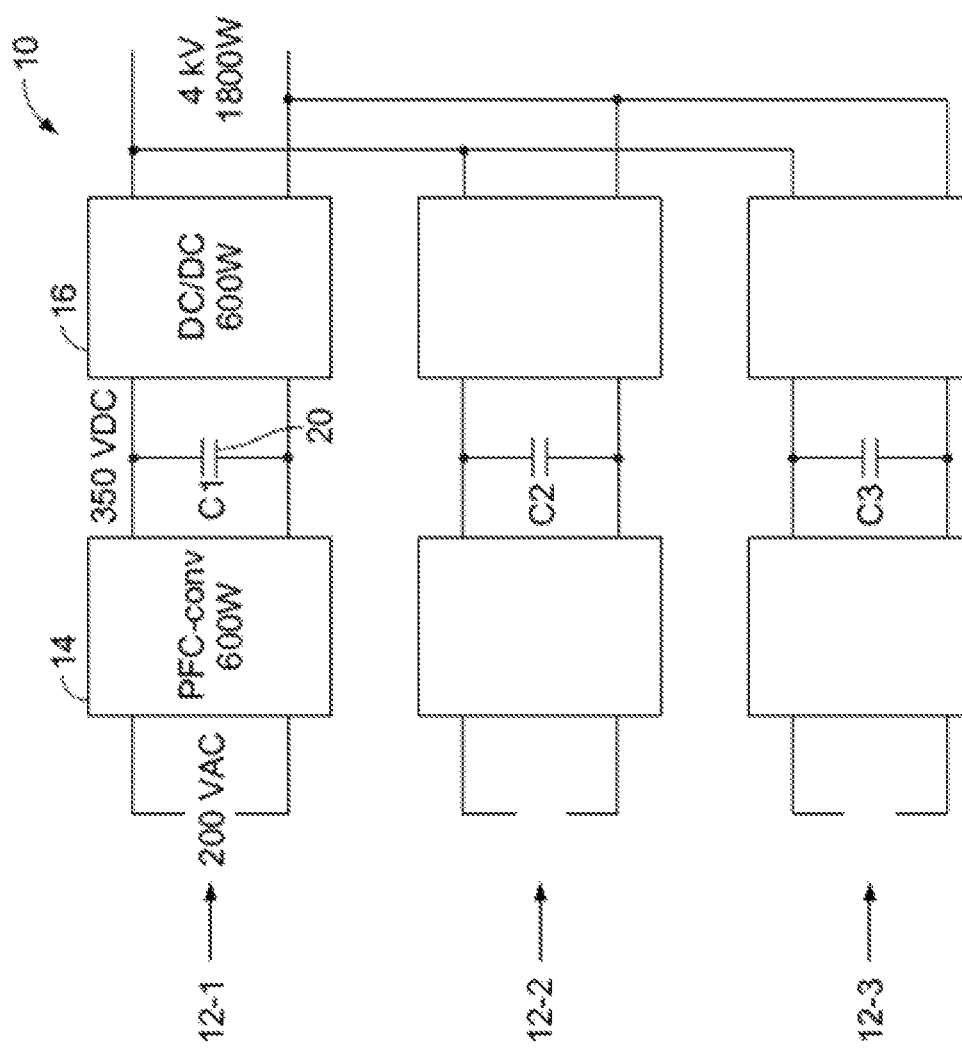
FIGS. 1A-1B are block diagrams of two conventional power supplies.
Figure 1B:
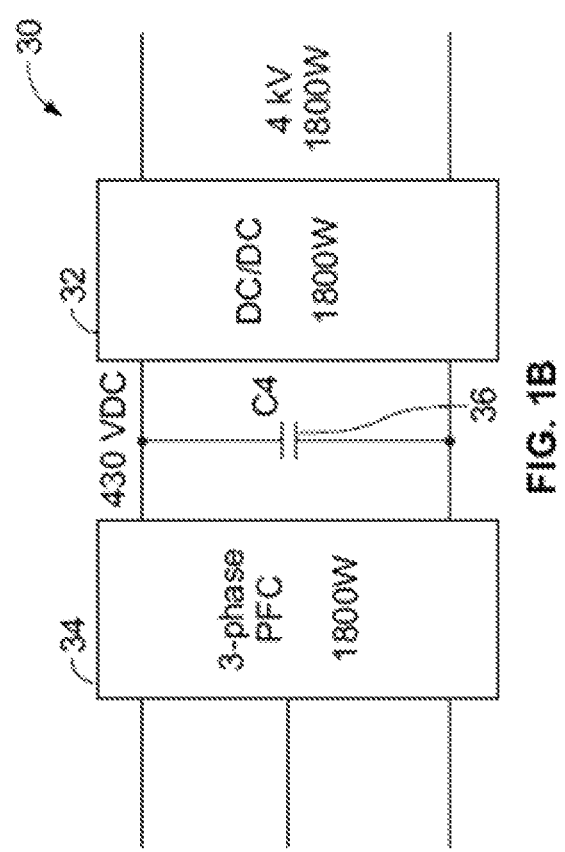

Turning first to FIGS. 1A and 1B, two conventional power supplies typically used with three-phase (3-phase) power source applications are illustrated. Referring first to FIG. 1A, a power supply 10 includes three modules 12. Each module 12 couples the power supply 10 to a power source output corresponding to a particular phase of a three-phase power source. Each module 12 includes a power factor correction stage 14 and a DC/DC stage 16. Rectified outputs of the modules 12 are connected in series to produce a single output of the power supply 10. Each module 12 also includes a respective PFC-capacitor 20 that temporarily stores energy provided by the PFC stage 14 and supplies the stored energy to the DC/DC converter 16.

Referring now to FIG. 1B, a conventional power supply 30 is similar to the power supply 10 of FIG. 1A, except that the power supply 30 includes a power factor correction (PFC) stage 34 to couple the power supply 30 to each phase of a three-phase power source, and a DC/DC stage 34. Similar to the power supply 10 of FIG. 1A, the power supply 30 includes a PFC capacitor 36 that temporarily stores energy provided by the PFC stage 34 and supplies the energy to the DC/DC converter 32.

Conventional power supplies, such as the power supplies illustrated in FIGS. 1A-1B, typically employ PFC electrolytic components, such as PFC capacitors, which may be expensive in terms of both size and cost of the power supply. In addition to being large and expensive, PFC electrolytic components result in reduced reliability of the conventional power supply due at least in part to aging characteristics of the PFC electrolytic components. Additionally, PFC electrolytic components cause high in-rush currents to be supplied to the output of the power supply when a power source is applied to the input of the power supply. Consequently, such conventional power supplies often include by-passing circuits and/or current limiters that may further increase size and cost of the power supply. When a power source is a multi-phase power source, such by-passing circuits are provided for each phase of the multi-phase power supply.

Additionally, such conventional power supplies typically experience a relatively high ripple at the output of the power supply, such as a relatively high ripple in an electrical current at the output of the power supply. Thus, a relatively large filter may be needed to provide a suitable power supply output for loads for which a relatively ripple-free power input may be desired (e.g., a magnetron). Further still, a drop in a voltage level of the power source results in an increase of current provided to a load of the power supply, which may cause instability in the power source, such as in the mains power grid, particularly if the load is large relative to capability of power source.

Figure 2:
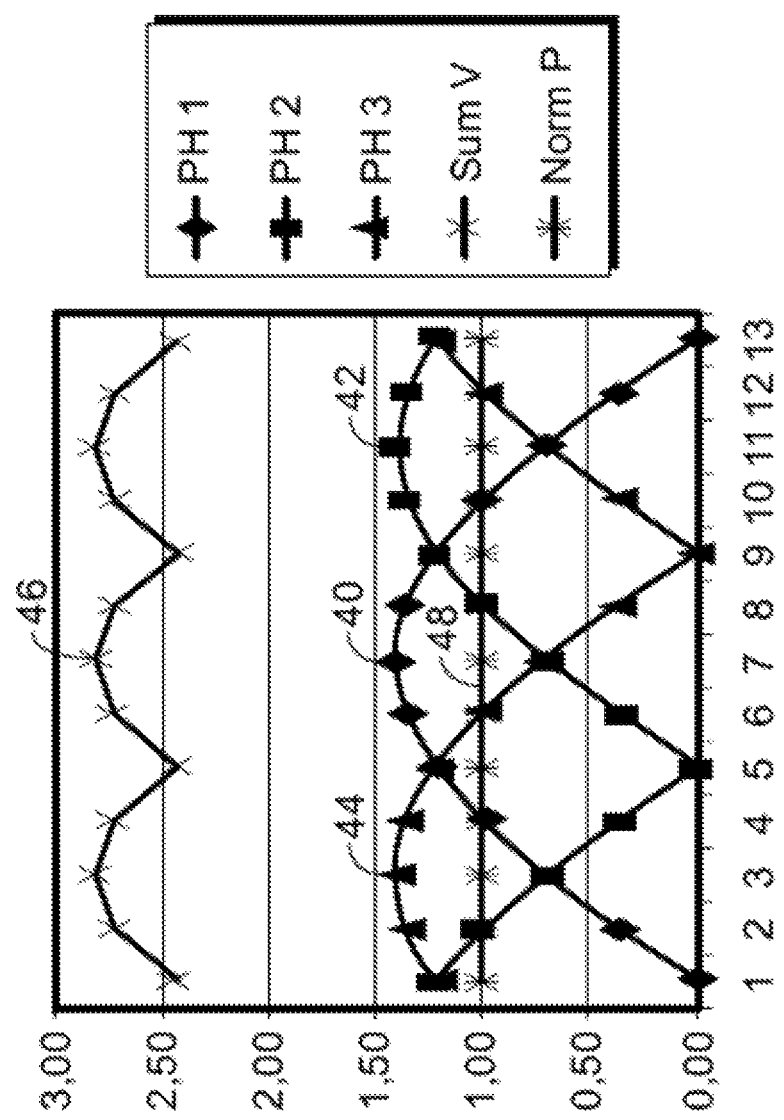
FIG. 2 is a set of plots illustrating effect of a linear load provided on each phase of a three-phase power source in accordance with an embodiment of the present disclosure.

FIG. 2 is a set of plots illustrating the effect of a suitably large resistive load provided on each phase of a three-phase power source. In particular, a plot 40 represents a periodic voltage wave corresponding to a first phase of the power source, a plot 42 represents a periodic voltage wave corresponding to a second phase of the power source, and a plot 44 represents a periodic voltage wave corresponding to a third phase of the power source. A plot 46, which represents a sum of absolute voltages of the three phases of the power source, shows a significant ripple present in the sum of absolute voltages of the three phases of the power source. On the other hand, a normalized power level obtained from the three phases of the power source, illustrated by a plot 48, is at least substantially ripple-free.

The ripple-free power level, illustrated by the plot 48, generally results when a suitably large resistive load is provided on each phase of the three-phase power supply. Under this condition, power extracted by the resistive load from each phase of the three phase power supply can be mathematically represented by a sine squared ($sin^2$) function, with 120° phase shift between the phases. Consequently, a power supply that appears as an at least substantially resistive load with respect to each of the three-phases of a power source ensures that the sum of the power extracted from the three phases of the power source is ripple free, thus ensuring a ripple-free output (e.g., ripple free current or voltage) provided to the load connected to the power supply. Such quasi-resonant power supply can obtain a power factor of 1.0, or a power factor close to 1.0, without use of a power factor correction module and power storing electrolytic components often employed in conventional power supplies.

Figure 3:
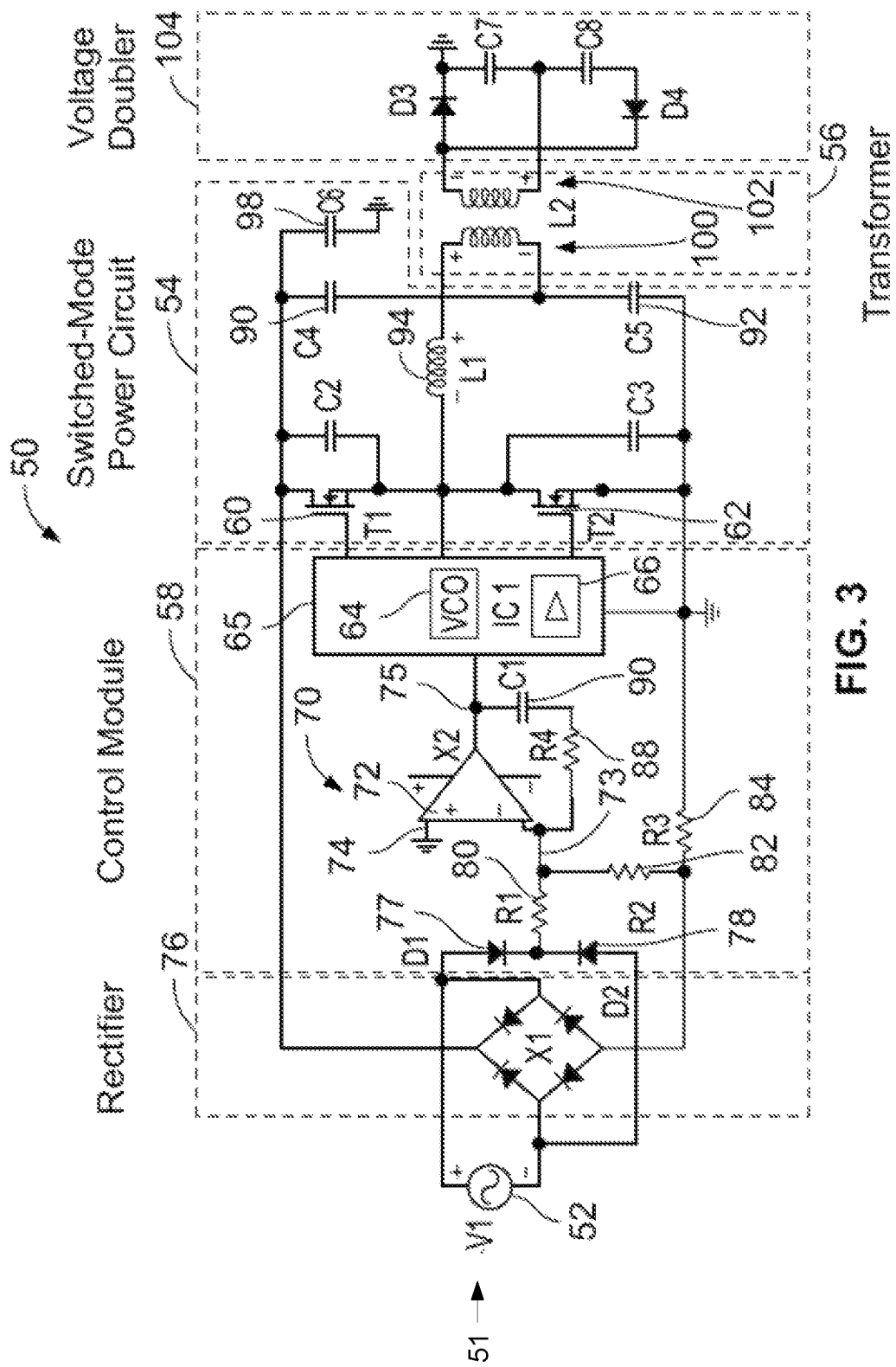
FIG. 3 is a circuit diagram of an example quasi-resonant power supply, according to an embodiment.

FIG. 3 is a circuit diagram of a quasi-resonant power supply 50, according to an embodiment of the present disclosure. The power supply 50 includes a power module 51 coupled to a power source 52. In an embodiment in which the power supply 50 operates with a multi-phase power source 52, the power supply 50 includes a respective power module 51 coupled to each phase of the multi-phase power input power source 52. For example, if the power source 52 is a three-phase power source, such as a power mains grid source, the power supply 50 includes three power modules 51 respectively coupled to the three phase lines of the power source, in an embodiment. Outputs of the power modules 51 are arranged in series or in parallel to provide a combined output of the power supply 50, in various embodiments.

With continued reference to FIG. 3, the power module 51 includes a switched-mode power circuit 54, such as a zero voltage switching (ZVS) converter, coupled to a transformer circuit 56. The switched-mode power circuit 54 includes a first switching element 60 and a second switching element 62. The first switching element 60 and the second switching element 62 may be transistors, such as field effect transistors (FET), for example.

The input of the switched-mode power circuit 54 is coupled to a control module 58 that controls operation of the switched-mode power circuit 54. The control module 58 includes a control unit 65 which, in turn, includes a voltage controlled oscillator (VCO) 64 and a transistor (e.g., FET transistor) driver circuit 66. The VCO 64 and the FET transistor driver circuit 66 are provided as a single control unit 65, in the illustrated embodiment. In another embodiment, the VCO 64 and the FET driver circuit 66 are provided as separate control elements in the power module 51. The control module 58 also includes a feedback loop circuit 70 that controls input signal provided to the control module 58. The feedback loop circuit 70 includes an error amplifier 72, which may be an operational amplifier circuit, for example. The error amplifier 72 includes an inverting input terminal 73, a non-inverting input terminal 74, and an output terminal 75. A rectifier circuit 77 rectifies a voltage signal from the power supply 52. A reference current signal, provided to the inverting input terminal 73 of the error amplifier 72, is obtained from the rectified voltage signal of the power source 52 via a first diode 77, a second diode 78 and a resistor 80. A resistor 88 and a capacitor 90, coupled between the inverting terminal 73 and the output terminal 75 of the error amplifier 72, determine the frequency response and the gain of the error amplifier 72. The feedback loop circuit 70 is generally fast-acting. The feedback loop circuit 70 is designed to operate with a maximum mains frequency of up to 800 Hz, for example, in some embodiments.

In operation, the error amplifier 72 compares the reference signal provided to the inverting input of the error amplifier 72 to a current sense signal obtained, from a current sensed by a current sense resistor 84, via a resistor 82. The error amplifier 72 operates to detect a difference between the power source voltage wave and the power source current shape at the input to the power module 51 at various angles of the voltage and current waves supplied by the power source 52 to the power module 51, and to adjust a signal at the output of the error amplifier 72 in accordance with the detected difference. The signal at the output of the error amplifier 72 is provided to the control unit 65. In particular, the signal at the output of the error amplifier 72 may control a frequency of the VCO 64 of the control unit 65. The FET driver circuit 66 is controlled by the frequency of the VCO 64 to generate control signals output by the control module 58 to control operation of the switched-mode power circuit 54. Control signals from the control module 58 may be provided to respective gate terminal of the transistors 60 and 62 to control respective ON/OFF states of the transistors 60 and 62 and to thereby adjust amount of power extracted by the switched-circuit circuit 54 from the power source 52 at any given time. Accordingly, the error amplifier 72 dynamically adjusts amount of instant power extracted from the power source at various angles of the voltage and current periodic waveforms of the power source, thereby controlling the voltage-to-current ratio at the input to the power module 51.

Because voltage-to-current ratio at the input to the power module 51 is controlled by the feedback loop circuit 70, a drop in power source voltage results in a drop of current extracted from the power source by the power supply 50, thereby maintaining stability of the power source. Further, because the voltage-to-current ratio of the input to the power module 51 is controlled, the power supply 50 effectively operates as an energy converter by extracting a predefined amount of power from the power source, and providing a converted predefined amount of power to the load, in an embodiment. This characteristic of the power supply 50 may be particularly useful in applications with a variable voltage load, such as in a magnetron application in which anode voltage of the magnetron may vary due to RF-load and overall thermal conditions in which the magnetron is operating.

Controlling the voltage-to-current ratio at the input to the power module 51 makes the power module 51 appear as a linear resistive load with respect to the power source 52 and ensures that power extracted from the power source is a $sin^2$ function, as describes above with respect to FIG. 2. A linear resistive load with respect to the power source 52 results in a power factor of 1.0, or close to 1.0 (e.g., 0.98), achieved by the power supply 50 even at relatively high power levels (e.g., at 1700 Watts), in at least some embodiments.

Resistance values of the resistor 80 and/or the resistor 82 may be adjustable, for example by way of linear resistor modulation or by way of pulse width modulation (PWM). In some embodiments, resistance values of the resistor 80 and/or the resistor 82 may be dynamically modulated or otherwise adjusted to control the actual average current entering the power module 51 and, accordingly, to control the true power level at the output of the power module 51. In an embodiment in which the power supply 50 includes multiple modules 51 respectively coupled to phase outputs of a multi-phase power source 52, the actual current and the true power level may be simultaneously dynamically adjusted in each of the power modules 51, thereby ensuring at least substantially equal load sharing among the phases of the power source 52. In another embodiment, a multiplier circuit is provided in place of the resistor 80 to provide the reference signal to the error amplifier 72. Additionally or alternatively, a multiplier circuit is provided in place of the resistor 82 to provide the reference signal to the error amplifier 72, in an embodiment. The multiplier circuit that provides the sense signal and/or the reference signal to the error amplifier 72 may be dynamically adjusted during operation of the power module 51.

In an embodiment, the control module 58 of the power module 51 comprises a signal processing device, such as a digital signal processor, that operates according to a mathematical model of interaction of the phases of a multi-phase power source 52. The signal processing device is used instead of the control unit 64 and the feedback loop circuit 70 to directly control operation of the switched-mode power circuit 54, in an embodiment. In a multi-phase power source system, operation of the digital signal processors of respective power modules 51 may be synchronized with an appropriate phase shift (e.g., 120° in a three-phase system) between the phases of the multi-phase power source to further enhance performance and stability characteristics of the power supply 50. In an embodiment in which power supply 50 includes multiple modules 51 respectively coupled to phase outputs of a multi-phase power source 52, a respective signal processing device is provided to control operation of the respective the multiple power modules 51. In another embodiment in which the power supply 50 includes multiple modules 51 respectively coupled to phase outputs of a multi-phase power source 52, a single signal processing device is provided to control operation of the multiple modules 51.

Referring still to FIG. 3, in an embodiment, the control module 58 is isolated from the switched-mode power circuit 54. The control signals provided by the control module 58 to the switched-mode power circuit 54 may be coupled to the switched-mode power circuit 54 via optocouplers (not shown in FIG. 3), or other suitable devices, configured to transfer the control signals from the isolated control module 58 to the switched-mode power circuit 54.

Figure 4:
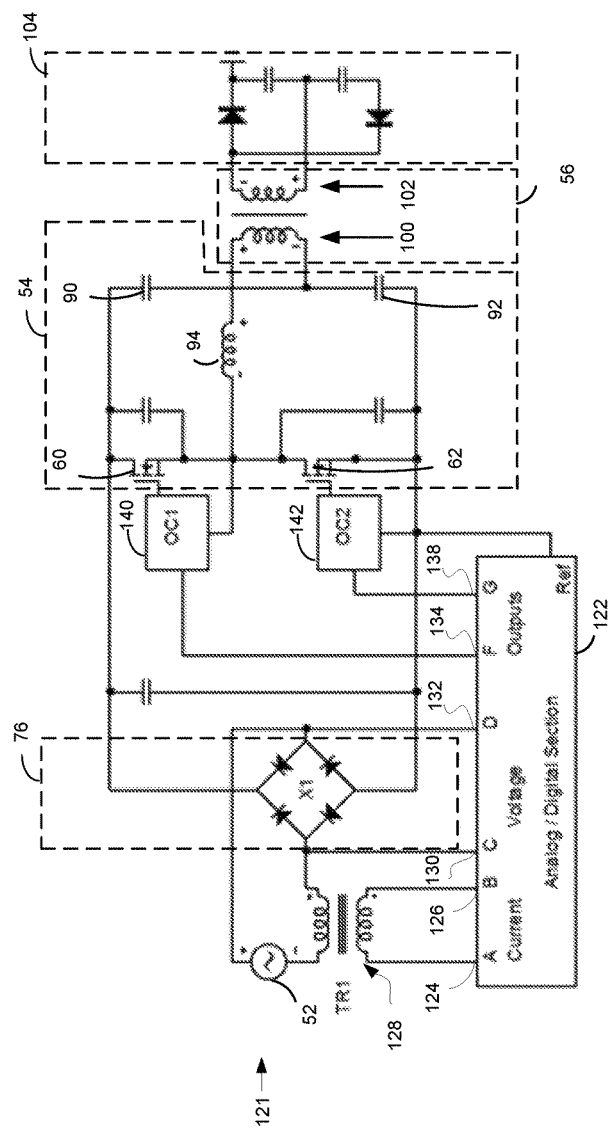
FIG. 4 is a circuit diagram of a power module, according to an embodiment.

Referring briefly to FIG. 4, in an embodiment, a power module 121 is generally the same as the power module 51 of FIG. 3, and includes many of the same-numbered elements with the power module 51 of FIG. 3, except that the power module 121 includes a control module 122 that is isolated from the switched-mode power circuit 54. The control module 122 may comprise the control module 58 described with respect to FIG. 3, for example. The control module 122 includes inputs 124, 126 for receiving reference current signal from the power source 52 via a transformer 128, and inputs 130, 132 for receiving reference voltage signal from the power source 52. The control module 122 may compare the reference current signal received via inputs 124, 126 and the reference voltage signal received via the inputs 130, 132, and may generate control signals to control operation of the transistors 60 and 62, as described with respect to FIG. 3. The control signals generated by the control module 122 may be provided to outputs 132, 134 of the control module, and may then be provided to the transistors 60 and 62 via optocouplers 140, 142, or via other suitable devices, coupled between the outputs 132, 134 and the transistors 60 and 62.

Referring back to FIG. 3, the power module 51 also includes a capacitor 90, a capacitor 92 and an inductor 94 that limit the maximum power capacity of the power module 51. Additionally, a capacitor 98 is provided to limit the ripple across the half bridge circuit of the switching elements 60, 62, in the illustrated embodiment. One or more of the capacitor 90, the capacitor 92, the inductor 94 and/or the capacitor 98 are omitted from the power module 51, in some embodiments.

With continued reference to FIG. 3, because the power supply 50 does not include a power factor correction stage and does not store energy in a corresponding PFC capacitor, the voltage level at a primary side 100 of the transformer 56 in operation does not exceed the peak voltage level of the power source, such as peak voltage of a power mains grid, in an embodiment. A secondary side 102 of the transformer 56 is coupled to a rectifier circuit, such as a voltage doubler circuit 104 in the illustrated embodiment. In another embodiment, the voltage doubler circuit 104 is replaced by a full wave rectifier circuit. In an embodiment in which a full wave rectifier circuit is used in place of the voltage doubler circuit 104, a single capacitor, with a relatively smaller capacitance value, is placed at the output of the full wave rectifier, thereby reducing energy loss at the output of the rectifier. Accordingly, a relatively smaller capacitance at the output of the power module 51 is subject to the ripple of the switching frequency of the power module 51 and/or to harmonics of the frequency of the power supply 52. Further, amount of current flowing through each diode of a full wave rectifier is reduced by 50% relative to the amount of current flowing through each of the diodes D3 and D4 in the voltage doubler 104 illustrated in FIG. 3. The reduced amount of current flowing through diodes of a full wave rectifier results in a higher reliability of the power module 51, in at least some embodiments.

As described above, in an embodiment, outputs of multiple power modules 51 may be connected in series, or in parallel, to produce a single output of the power supply 50, in an embodiment. The turn ratio of the transformer 56 of each of the power modules 51 may be determined such that output voltage of each of the power modules 51 is maintained at 50% of a nominal voltage required at the single output of the power supply 50. Maintaining voltage at 50% of a nominal voltage required or desired at the single output of the power supply 50 may increase or maximize efficiency of each power module 51.

Figure 5:
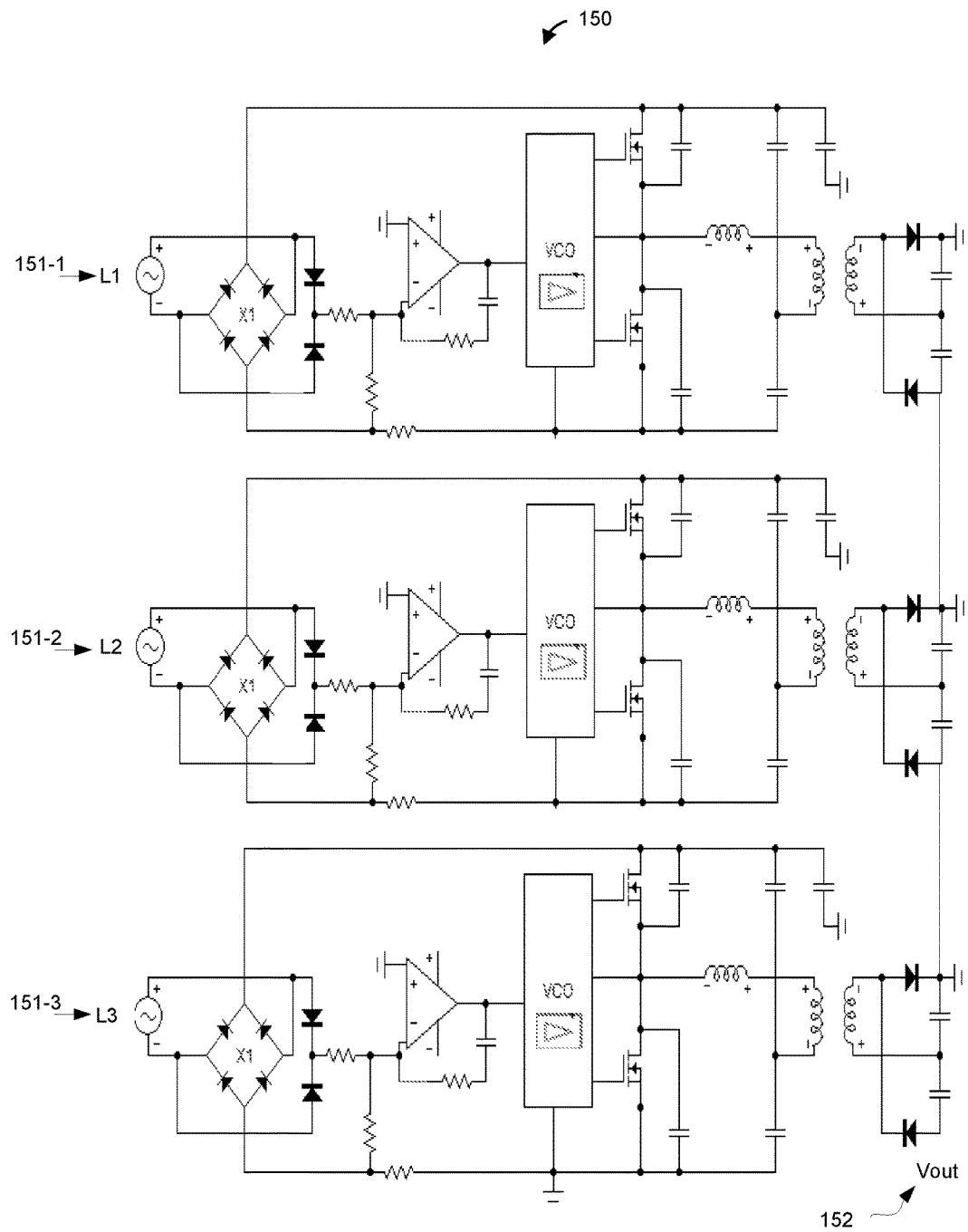
FIG. 5 is a circuit diagram of an example quasi-resonant power supply, according to another embodiment.

FIG. 5 is a block diagram of a power supply 150, according to an embodiment. The power supply 150 includes three power modules 151 to respectively couple the power supply 150 to each output of a three phase power source, such as a three phase mains power source. In an embodiment, each of the power modules 151 is the same as the power module 51 of FIG. 3. In another embodiment, each of the power modules 151 is the same as the power module 121 of FIG. 5. In an embodiment, respective outputs of the three modules 151 are connected in series to produce a single output voltage signal illustrated in FIG. 4 as Vout 152. In an embodiment, turn ratios of respective transformers of the three power modules 150 are such that voltage output signals of the respective converters are at 50% of a nominal voltage required or desired to be maintained at Vout 152. Maintaining voltage output signals of the respective converters are at 50% of the nominal voltage required or desired at Vout 152 ensures a relatively high (e.g., a maximum) power converter efficiency in the power supply 150, in at least some embodiments. The voltage signal at Vout 152 is supplied to a magnetron anode, in an embodiment.

Figure 6:
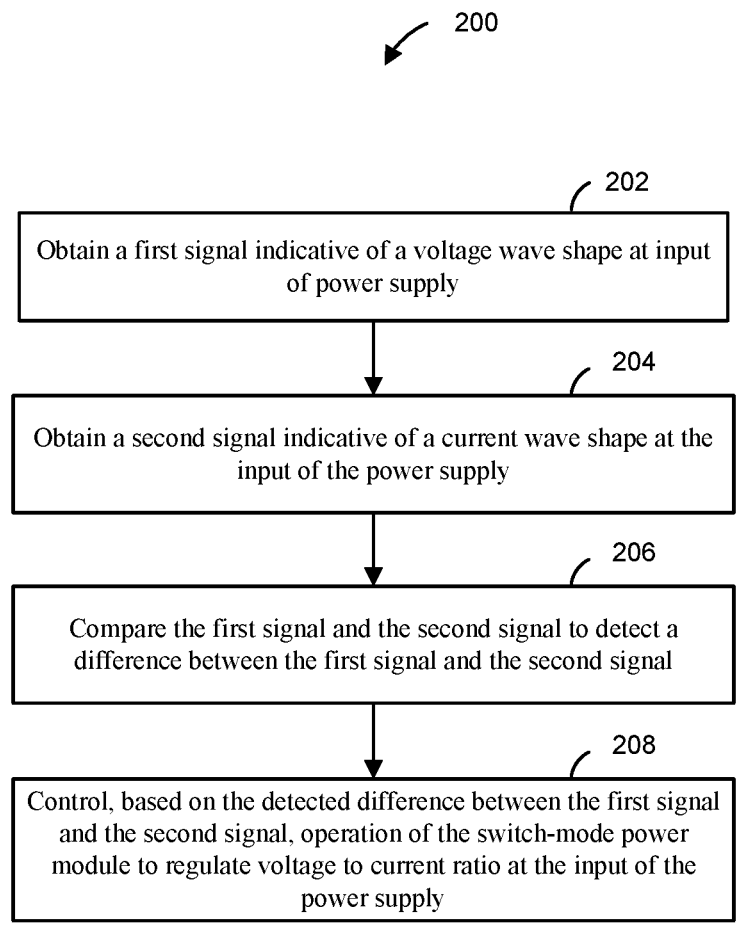
FIG. 6 is a flow chart of a method of operating a power supply, according to an embodiment.

FIG. 6 is a flow chart of a method 200 of operating a power supply, according to an embodiment. In an embodiment, the method 200 is performed in conjunction with the power supply 50 of FIG. 3. In another embodiment, the method 200 is performed with a suitable power supply different from the power supply 50 of FIG. 3. The power supply comprises an input to couple the power supply to a power source, and a switched-mode power circuit to extract electrical energy from the power source, wherein the electrical energy is to be transferred to a load. At a step 202, a first signal is obtained. The first signal is indicative of a voltage wave shape at the input to the power supply. The first signal is obtained, for example, from a rectified voltage signal provided to the input of the power supply from an output of an alternating current (AC) power source, such as a phase of a mains power source.

At a step 204, a second signal is obtained. The second signal is indicative of a current wave shape at the input of the power supply. The second signal is obtained, for example, by sensing the current via a current sense resistor. At a step 206, the first signal obtained at the step 202 is compared with the second signal obtained at the step 204 to detect a difference between the first signal and the second signal. The difference between the first signal and the second signal corresponds to an instantaneous difference between the voltage signal and the current signal at the input of the power supply. In an embodiment, the first signal and the second signal are compared by an error amplifier. In another embodiment, the first signal and the second signal are compared by a digital circuit, such as a digital processor.

At a step 208, operation of the switch-mode power module is controlled based on the difference between the first signal and the second signal detected at the step 206. Operation of the switch-mode power module is controlled to regulate a ratio of the voltage to the current at the input to the power supply. The ratio may be regulated to ensure that the ratio is at least substantially constant, or at least substantially linear, over time. Regulating the voltage-to-current ratio so that the ratio is at least substantially constant, or at least substantially linear, over time, in turn, makes the power supply appear at least substantially resistive to the power source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What I claim is:

1. A power supply, comprising:
   at least one input to couple the power supply to a power source;
   at least one switched-mode power circuit configured to extract power from the power source, wherein the power is to be transferred to a load; and
   at least one control module coupled between the at least one input and to the at least one switched-mode power circuit, the at least one control module having
      an input for obtaining a voltage signal representative of a voltage wave shape supplied by the power source, and an input for obtaining a current signal representative of a current wave shape supplied by the power source,
      a control unit configured to generate at least one control signal based on a difference between the voltage wave shape and the current wave shape supplied by the power source, and
      an output for providing the at least one control signal to the at least one switched-mode power circuit to control operation of the switched-mode power circuit to regulate a voltage-to-current ratio at the at least one input of the power supply.

2. The power supply of claim 1, wherein the power source is a three-phase mains power source, and wherein
   the at least one input comprises respective inputs to couple the power supply to respective phases of the three-phase mains power source,
   the at least one switched-mode power circuit comprises respective switched-mode power circuits to extract electrical energy from the respective phases of the three-phase mains power source, and
   the at least one control module comprises respective control modules configured to control operation of the respective switched-mode power circuits, wherein each of the respective control module is configured to regulate a voltage-to-current ratio at the corresponding input of the power supply.

3. The power supply of claim 2, further comprising
   respective power transformers coupled to outputs of the respective switched-mode power circuits, and
   respective rectifier circuits coupled to outputs of the respective power transformers, and wherein
   outputs of the respective rectifier circuits are connected in series to produce a single power supply output to couple the power supply to the load.

4. The power supply of claim 1, wherein the control module is configured to regulate the voltage-to-current ratio at the input of the power supply to make the power supply appear as a linear resistive load to the power source.

5. The power supply of claim 1, further comprising an error amplifier having an output coupled to the control unit, wherein:
the error amplifier is configured to
detect the difference between the voltage wave shape and the current wave shape supplied by the power source, and
adjust a signal at the output of the error amplifier in accordance with the detected difference between the voltage wave shape and the current wave shape, and
the control unit is configured to generate the at least one control signal based on the signal at the output of the error amplifier.

6. The power supply of claim 5, wherein the control unit comprises a voltage controlled oscillator coupled to a field effect transistor driver circuit, wherein a frequency of the voltage controlled oscillator is controlled by the signal at the output of the error amplifier.

7. The power supply of claim 1, wherein the control module includes a digital signal processor configured to generate the at least one control signal.

8. The power supply of claim 1, wherein the control module is isolated from the switched-mode power circuit, and wherein the power supply further comprises at least one optocoupler to transfer the at least one control signal from the control module to the switched-mode power circuit.

9. The power supply of claim 1, wherein the load is a magnetron.

10. A power supply, comprising:
a respective input to couple the power supply to each of three phase outputs of a three-phase power source;
a respective switched-mode power circuit configured to extract power from a respective phase of the power source; and
at least one control module including
an input for obtaining a voltage signal representative of a voltage wave shape supplied by each phase of the power source, and an input for obtaining a current signal representative of a current wave shape supplied by each phase of the power source,
a control unit configured to generate at least one control signal based on respective differences between respective voltage wave shapes and corresponding current wave shapes supplied by the phase of the power source, and
an output for providing the at least one control signal to the respective switched-mode power circuits to control operation of the respective switched-mode power circuits to regulate a voltage-to-current ratio at each of the respective inputs of the power supply.

11. The power supply of claim 10, wherein the at least one control module further comprises an error amplifier having an output coupled to the control unit, and wherein:
the error amplifier is configured to
detect a difference between a voltage wave shape and a current wave shape supplied by a phase of the power supply, and
adjust a signal at the output of the error amplifier in accordance with the detected difference between the voltage wave shape and the current wave shape, and
the control unit is configured to generate the at least one control signal based at least in part on the signal at the output of the error amplifier.

12. The power supply of claim 11, wherein the control unit comprises a voltage controlled oscillator coupled to a field effect transistor driver circuit, wherein the voltage controlled oscillator is configured to control operation of the field effect transistor driver circuit, and wherein a frequency of the voltage controlled oscillator is controlled by the output signal.

13. The power supply of claim 10, wherein the control unit comprises a digital signal processor configured to generate the at least one control signal.

14. The power supply of claim 10, wherein the at least one control module is isolated from the respective switched-mode power circuits, and wherein the power supply further comprises at least one optocoupler to transfer the at least one control signals from the at least one control module to the respective switched-mode power circuits.

15. A method of regulating a power supply having an input to couple the power supply to a power source and a switched-mode power circuit to extract power from the power source, wherein the power is to be provided to a load, the method comprising:
obtaining a first signal indicative of a voltage wave shape at the input of the power supply;
obtaining a second signal indicative of a current wave shape at the input of the power supply;
comparing the first signal and the second signal to detect a difference between the first signal and the second signal;
generating at least one control signal based on the difference between the first signal and the second signal, and
controlling, using the at least one control signal, operation of the switched-mode power circuit to regulate a voltage-to-current ratio at the input of the power supply.

16. The method of claim 15, wherein obtaining the first signal comprises obtaining the first signal from a rectified voltage signal at the input of the power supply.

17. The method of claim 15, wherein obtaining the second signal comprises sensing a current signal at the input of the power supply using a current sense resistor.

18. The method of claim 15, wherein obtaining the second signal comprises obtaining the second signal via a resistor, and wherein the method further comprises modulating a resistance of the resistor to adjust amount of energy extracted by the switched-mode power circuit from the power source.

19. The method of claim 15, wherein obtaining the first signal comprises obtaining the first signal via a resistor, and wherein the method further comprises modulating a resistance of the resistor to adjust amount of energy extracted by the switched-mode power circuit from the power source.

20. The method of claim 14, wherein the load is a magnetron.

* * * * *